United States Patent [19]

Butzen et al.

[11] Patent Number: 4,903,944
[45] Date of Patent: Feb. 27, 1990

[54] VALVE ASSEMBLY AND METHOD

[75] Inventors: James K. Butzen, Grayslake, Ill.; Kenneth C. Happ, Silver Lake, Wis.

[73] Assignee: Snap-on Tools Corporation, Kenosha, Wis.

[21] Appl. No.: 304,268

[22] Filed: Jan. 31, 1989

[51] Int. Cl.$^4$ .................... F16K 1/14; F16K 31/60
[52] U.S. Cl. ..................... 251/240; 251/241; 251/322; 137/901; 137/454.2
[58] Field of Search ............... 251/321, 322, 323, 239, 251/240, 241; 137/901, 454.2

[56] References Cited

U.S. PATENT DOCUMENTS

| | | |
|---|---|---|
| 718,550 | 1/1903 | Vaughan .................. 251/239 X |
| 1,462,263 | 7/1923 | Chaney . |
| 1,541,794 | 6/1925 | Costa . |
| 1,568,522 | 1/1926 | Mitterreiter . |
| 1,903,605 | 4/1933 | Allen . |
| 2,128,627 | 5/1937 | Vogt . |
| 2,368,281 | 1/1945 | Wittenberg . |
| 2,693,201 | 11/1954 | Page .................... 251/239 X |
| 3,964,510 | 6/1976 | Roller . |
| 4,018,292 | 4/1977 | Roll et al. . |
| 4,120,315 | 10/1978 | Snyder . |
| 4,273,310 | 6/1981 | Ginzler . |
| 4,390,159 | 6/1983 | Duncan . |
| 4,456,223 | 6/1984 | Ebling . |
| 4,553,562 | 11/1985 | Nakada . |
| 4,606,367 | 8/1986 | Britt . |
| 4,694,862 | 9/1987 | Rott .................... 137/901 X |

*Primary Examiner*—Arnold Rosenthal
*Attorney, Agent, or Firm*—Emrich & Dithmar

[57] ABSTRACT

A valve assembly for use with a fluid-driven tool having an elongated conduit with a bore communicating with the source of fluid, and an elongated valve member received in the bore. The valve assembly has a ball received in a chamber defining a valve seat, with the chamber communicating with the source in order to drive the ball against the seat. The valve assembly has a valve pin extending through the conduit in order to actuate and move the ball away from the valve seat to permit passage of the fluid through the valve member past the seat, and a paddle for actuating the valve pin in order to open the valve.

18 Claims, 1 Drawing Sheet

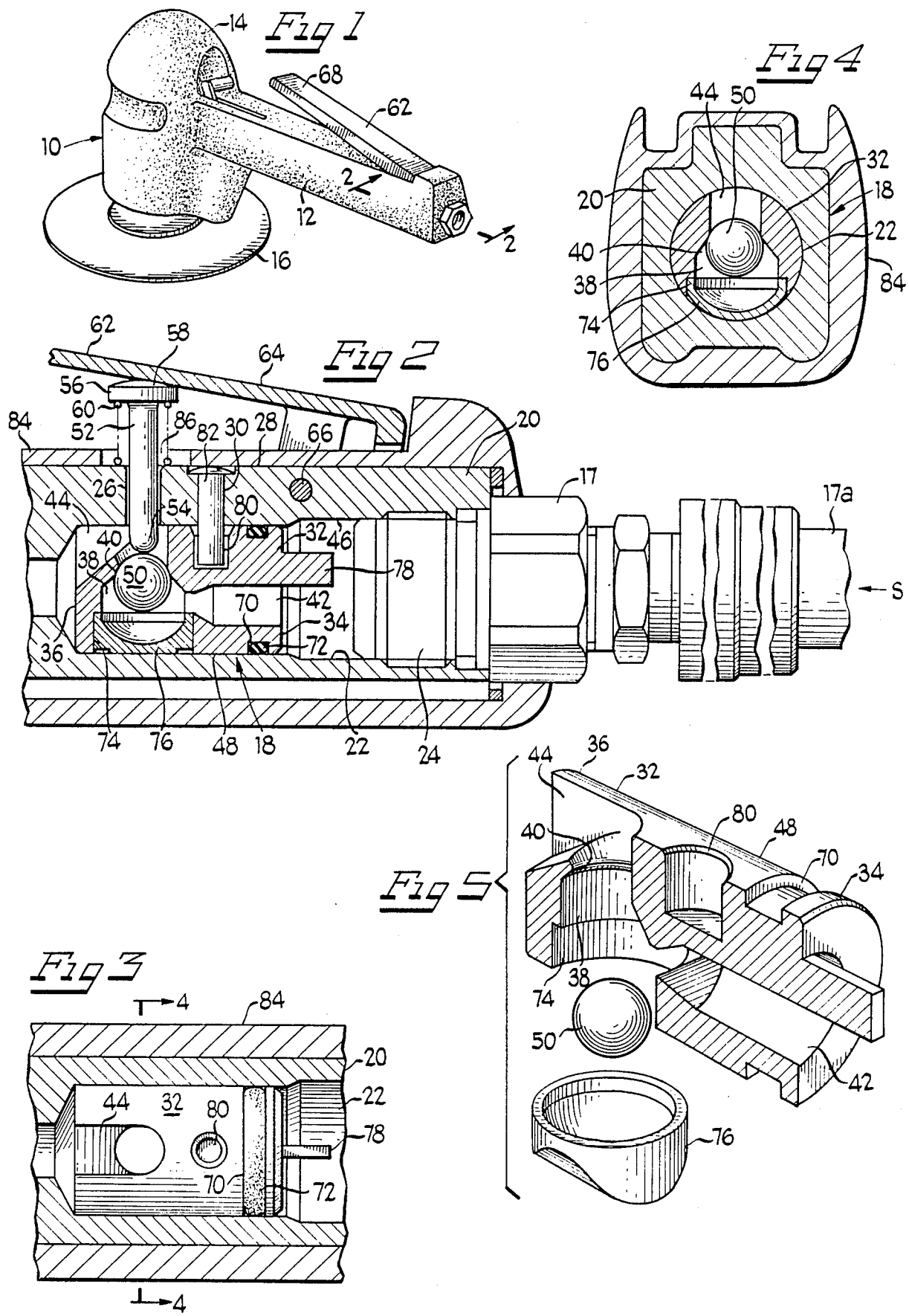

VALVE ASSEMBLY AND METHOD

BACKGROUND OF THE INVENTION

This application relates to a valve assembly for use with a pneumatic tool such as an air sander. Although valve assemblies of various types are known, such valve assemblies are normally relatively complex in construction, and are thus substantially expensive in cost and may not operate satisfactorily during use due to this complexity. Further, such valve assemblies are not normally particularly suitable for use in a pneumatic tool to provide the desired operation, and are normally difficult to incorporate into the structure of the pneumatic tool in a simplified manner.

SUMMARY OF THE INVENTION

It is an object of the present invention to provide a valve assembly for use with a pneumatic tool in which the valve assembly has a simplified construction and reduced cost, has increased reliability, and may be incorporated into the pneumatic tool in a simplified manner.

In summary, there is provided a valve assembly for use with a fluid-driven tool, comprising an elongated conduit having a bore extending axially therethrough and having an inlet port for connection to the source, said conduit having an opening extending radially therethrough, an elongated valve member in said bore and having proximal and distal ends, said valve member having a chamber defining a seat generally aligned with said opening, an inlet passageway extending from said chamber to said proximal end and communicating with said inlet port upstream from said valve member, and an outlet passageway extending from said seat to said distal end and communicating with said bore downstream from said valve member, a ball in said chamber and having a size to sealingly engage against said seat and being driven into sealing engagement against the seat by the fluid, a valve pin slidably received in said opening and having an inner end directed toward said seat and an outer end extending out of said conduit, means for moving said valve pin between an outer position with said inner end spaced from the ball, and an inner position with said inner end engaged adjacent said ball a sufficient distance to move the ball away from said seat and permit passage of the fluid from the source through said inlet port and said inlet passageway into said chamber, and past said seat into said outlet passageway and said bore downstream from said valve member, and means for sealing said valve member to said conduit to prevent passage of fluid therebetween.

The invention consists of certain novel features and a combination of parts hereafter fully described, illustrated in the accompanying drawings, and particularly pointed out in the appended claims, it being understood that various changes in the details may be made without departing from the true spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective of a pneumatic tool in the form of a sander which includes a valve assembly of the present invention;

FIG. 2 is a fragmentary sectional view, on an enlarged scale, taken along the line 2—2 of FIG. 1;

FIG. 3 is a fragmentary view, taken partly in section, illustrating a valve element received in a handle of the pneumatic tool of FIG. 1;

FIG. 4 is a sectional view taken along the line 4—4 of FIG. 3; and

FIG. 5 is an exploded view, taken partly in section, of the valve assembly of the present invention.

DESCRIPTION OF THE PREFERRED EMBODIMENT

Referring now to FIG. 1, there is shown a pneumatic tool generally designated 10 in the form of a sander having an elongated handle 12 connected to a housing 14 which supports and drives a pad 16 retaining a sanding sheet for use in sanding a suitable object. As will be described below, the pad 16 is rotatably driven by fluid which passes through the handle 12 and drives a mechanism in the housing 14 for rotating the pad 16 during use of the tool 10. A fitting 17 is adapted for connection to an air hose 17a (FIG. 2).

With reference to FIGS. 2-5, the handle 12 includes a valve assembly generally designated 18 for use with the tool 10 from a source S of fluid, such as air. The valve assembly 18 has elongated conduit 20 having a generally linear bore 22 extending therethrough, and having an inlet port 24 connected to the source S, with the conduit 20 having first and second openings 26 and 30 extending radially through the conduit 20 between an outer surface 28 of the conduit 20 and the bore 22.

The valve assembly 18 has an elongated valve member 32 which may be injection molded such that no machining of the valve member 32 is required. As shown, the valve member 32 is received in the bore 22 with a proximal end 34 of the valve member 32 being directed toward an upstream portion of the bore 22 and the inlet port 24, and a distal end 36 being directed toward a downstream portion of the bore 22. The valve member 32 has a chamber 38 defining a valve seat 40 generally aligned with the first opening 26, an inlet passageway 42 extending from the chamber 38 to the proximal end 34 of the valve member 32 and communicating with the inlet port 24 upstream from the valve member 32, and an outlet passageway 44 extending from the valve seat 40 to the distal end 36 of the valve member 32 and communicating with the bore 22 downstream from the valve member 32. The conduit 20 has an inner surface 46 defining the bore 22, and the valve member 32 has an outer surface 48 facing the inner surface 46 of the conduit 20. In a preferred form, the outlet passageway 44 communicates with the outer surface 48 of the valve member 32.

The valve assembly 18 has a spherical ball 50 received in the chamber 38 and having a size to sealingly engage against the valve seat 40, with the fluid from the source S driving the ball 50 against the seat 40 in order to close the valve assembly 18.

The valve assembly 18 has a valve pin 52 slidably received in the first opening 26 of the conduit 20, with the pin 52 having an inner end 54 directed towards the seat 40 and an outer end 56 extending out of the conduit 20. The valve pin 52 has an outwardly directed peripheral head 58 at the outer end 56, and a helical spring 60 extending between the outer surface 28 of the conduit 20 to the head 58 and receiving the pin 52, such that the spring 60 biases the pin 52 in a direction outwardly from the conduit 20. The tool 10 has an elongated paddle 62 having one end 64 pivotally connected to the conduit 20 by a pin 66, and an outer end 68 (FIG. 1) directed toward the housing 14 of the tool 10. As shown in FIG. 2, the paddle 62 is positioned to engage the outer end 56 of the valve pin 52 and move the valve pin 52 between a first outer position with the inner end 54 of the valve pin 52 spaced from the ball 50, and a second inner position with the inner end 54 engaged against the ball 50 for a sufficient distance to move the ball 50 away from the valve seat 40 and permit passage of the fluid from the source S through the inlet port 24 and inlet passageway 42 into the chamber 38, and past the seat 40 into the outlet passageway 44 and the bore 22 downstream from the valve member 32.

Thus, in accordance with the present invention, in a normal condition of the valve assembly 18, the spring 60 biases the valve pin 52 to the first outer position in order to permit the fluid from the source S to drive the ball 50 against the valve seat 40 and close the valve assembly 18 during which time operation of the pneumatic tool 10 ceases. When it is desired to operate the tool 10, the paddle 62 is pressed in order to move the valve pin 52 through the first opening 26, engage the ball 50, and move the ball 50 away from the valve seat 40 in order to permit passage of the fluid from the source S through the valve assembly 28 into the housing 14 of the tool 10 where it operates the driving mechanism in order to rotate the pad 16 and permit sanding of a suitable object. When it is desired to stop operation of the tool 10, the paddle 62 is released, and the spring 60 biases the valve pin 52 to the first outer position in order to permit the ball 50 to move against the valve seat 40 and close the valve assembly 28, such that the valve assembly 28 prevents passage of fluid past the valve member 32. Thus, in accordance with the present invention, the valve assembly 18 may be operated in a simplified manner in order to permit operation of the tool 10.

The valve member 32 has an outer circumferential groove 70 adjacent the proximal end 34 which receives an elastic O-ring 72 to sealingly engage against the inner surface 46 of the conduit 20, and prevent passage of fluid between the outer surface 48 of the valve member 32 and the inner surface 46 of the conduit 20.

The valve member 32 has a bore 74 extending from the chamber 38 to the outer surface 48 of the valve member 32 and aligned with the valve seat 40. The valve assembly 18 has a semicylindrical cap 76 of a suitable elastic material which is received in the bore 74 in sealing engagement against the surfaces defining the bore 74 and against the inner surface 46 of the conduit 20 in order to prevent passage of fluid through the bore 74.

The valve member 32 has a tab 78 at the proximal end 34 of the valve member 32. The valve member 32 has an outer recess 80 communicating with the outer surface 48 of the valve member 32 and being aligned with the second opening 30 of the conduit 20. An alignment pin 82 is received in the second opening 30 of the conduit 20 and the recess 80 of the valve member 32 in order to prevent rotation of the valve member 32 in the conduit 20. The tool 10 also comprises cover 84 which includes an elongated portion covering the conduit 20 and the second opening 30 of the conduit 20 to prevent inadvertent removal of the alignment pin 82 from the conduit 20 and valve member 32. The sleeve 84 has an aperture 86 aligned with the first opening 26 of the conduit 20 to permit passage of the valve pin 52 therethrough.

In accordance with a method of the present invention, the valve assembly may be assembled in a simplified manner as follows. With the valve member 32 removed from the conduit 20 and with the cap 76 removed from the bore 74, the ball 50 is placed in the chamber 38 of the valve member 32, and the cap 76 is placed oriented and pressed into sealing engagement in the bore 74 in order to close the bore 74 and retain the ball 50 in the chamber 48. The O-ring 72 is placed in the groove 70 of the valve member 32. Next, the valve member 32 is inserted into the bore 22 of the conduit 20, and the tab 78 is manipulated in order to facilitate alignment of the recess 80 of the valve member 32 with the second opening 30 of the conduit 20, after which the alignment pin 82 is inserted into the second opening 30 of the conduit 20 and recess 80 of the valve member 32 in order to prevent rotation of the valve member 32 within the conduit 20. Of course, the alignment pin 82 is inserted into the openings 30 and 80 prior to placement of the conduit 20 within the cover 84. The pin 52 is inserted through the aperture 86 of the cover 84 and opening 26 of the valve member 32. Thus, in accordance with the present invention, the valve assembly may be assembled in a simplified manner to greatly enhance the production speed of the manufacturing of the tool 10.

While there has been described what at present is considered to be the preferred embodiment of the present invention, it will be apparent to those skilled in the art that various modifications and alterations may be made herein without departing from the true spirit and scope of the invention. It is intended that all such variations and modifications are to be covered in the claims appended hereto.

We claim:

1. A valve assembly for use with a fluid-driven tool comprising: an elongated conduit including a bore extending axially therethrough, said bore having a first portion of substantially constant first diameter and a second portion of a second diameter no less than said first diameter, said conduit including an inlet port for connection to the source and communicating with said second portion, said first and second portions and said inlet port being generally coaxial, said conduit including an opening extending radially therethrough; an elongated valve member extending axially in said first portion and having proximal and distal ends, said valve member having a chamber defining a seat generally aligned with said opening, an inlet passageway extending from said chamber to said proximal end and communicating with said inlet port upstream from said valve member, and an outlet passageway extending from said seat to said distal end and communicating with said first portion downstream from said valve member; a ball in said chamber and having a size to sealingly engage against said seat and being driven into sealing engagement against the seat by the fluid; a valve pin slidably received in said opening and having an inner end directed toward said seat and an outer end extending out of said conduit; means for moving said valve pin between an outer position with said inner end spaced from the ball, and an inner position with said inner end engaged adjacent said ball for a sufficient distance to move the ball away from said seat and permit passage of the fluid from the source through said inlet port and said inlet passageway into said chamber, and past said seat into said outlet passageway and said bore downstream from said valve member; and means for sealing said valve member to said conduit to prevent passage of fluid therebetween.

2. The valve assembly of claim 1, and further comprising means for biasing the valve pin outwardly away from said seat.

3. The valve assembly of claim 2, wherein the outer end of said valve pin carries a head, said biasing means being a helical spring extending between the conduit and said head around the valve pin.

4. The valve assembly of claim 1, wherein said moving means includes an elongated paddle having one end pivotally connected to the conduit and another portion engagable against the outer end of said valve pin.

5. The valve assembly of claim 1, wherein said valve member has an outer circumferential groove, said sealing means being an elastic O-ring in said groove and sealingly engaging against said valve member and said conduit.

6. The valve assembly of claim 1, wherein said valve member includes a bore extending radially from the chamber to said conduit and aligned with said seat, and an elastic member received in sealing engagement in said bore and closing said bore.

7. The valve assembly of claim 6, wherein said elastic member is a cap having a cylindrical portion sealingly engaging said conduit.

8. The valve assembly of claim 1, wherein said conduit includes a further opening extending radially therethrough, said valve member has a recess therein aligned with said second opening, and further comprising alignment pin and extending through said second opening into said recess.

9. The valve assembly of claim 8, wherein said valve member includes a tab at said proximal end to facilitate manipulation of said valve member.

10. The valve assembly of claim 8, and further comprising a shell covering said conduit and said second opening, said shell having an aperture aligned with said first opening.

11. The valve assembly of claim 1, wherein said outlet passageway extends axially and radially.

12. The valve assembly of claim 1, wherein the bore in said conduit is generally linear.

13. A method of assembling a valve assembly comprising the steps of: providing a valve member having proximally and distal ends and having a chamber defining a seat, an inlet passageway extending from said chamber to said proximal end, and outlet passageway extending from said seat to said distal end, and a bore extending radially through said valve member; placing a ball through said bore into said chamber; closing said bore with a sealing member while retaining the ball in said chamber; providing an elongated conduit having a conduit bore extending axially therethrough; said conduit bore having a first portion of substantially constant first diameter and a second portion of a second diameter no less than said first diameter, said first and second portions being generally coaxial, and inserting the valve member into the bore of the conduit through said second portion and into said first portion while sealing the space between said valve member and said conduit.

14. The method of claim 13, including the steps of manipulating said valve member in said bore to align an outer opening of said valve member with a bore extending through said conduit, and inserting an alignment pin through said conduit opening into said valve member opening in order to prevent rotation of said valve member in said conduit.

15. The method of claim 14, wherein the manipulating step comprises manipulating a tab at one end of said valve member to align said valve member in said conduit.

16. The valve assembly of claim 1, wherein said first and second portions and said inlet port are cylindrical.

17. The valve assembly of claim 1, wherein the diameter of said inlet port is greater than the diameter of said second portion.

18. The valve assembly of claim 17, wherein the diameter of said second portion is greater than the diameter of said first portion.

* * * * *